J. B. OLESON.
STANCHION.
APPLICATION FILED JUNE 11, 1910.
1,001,071.
Patented Aug. 22, 1911.
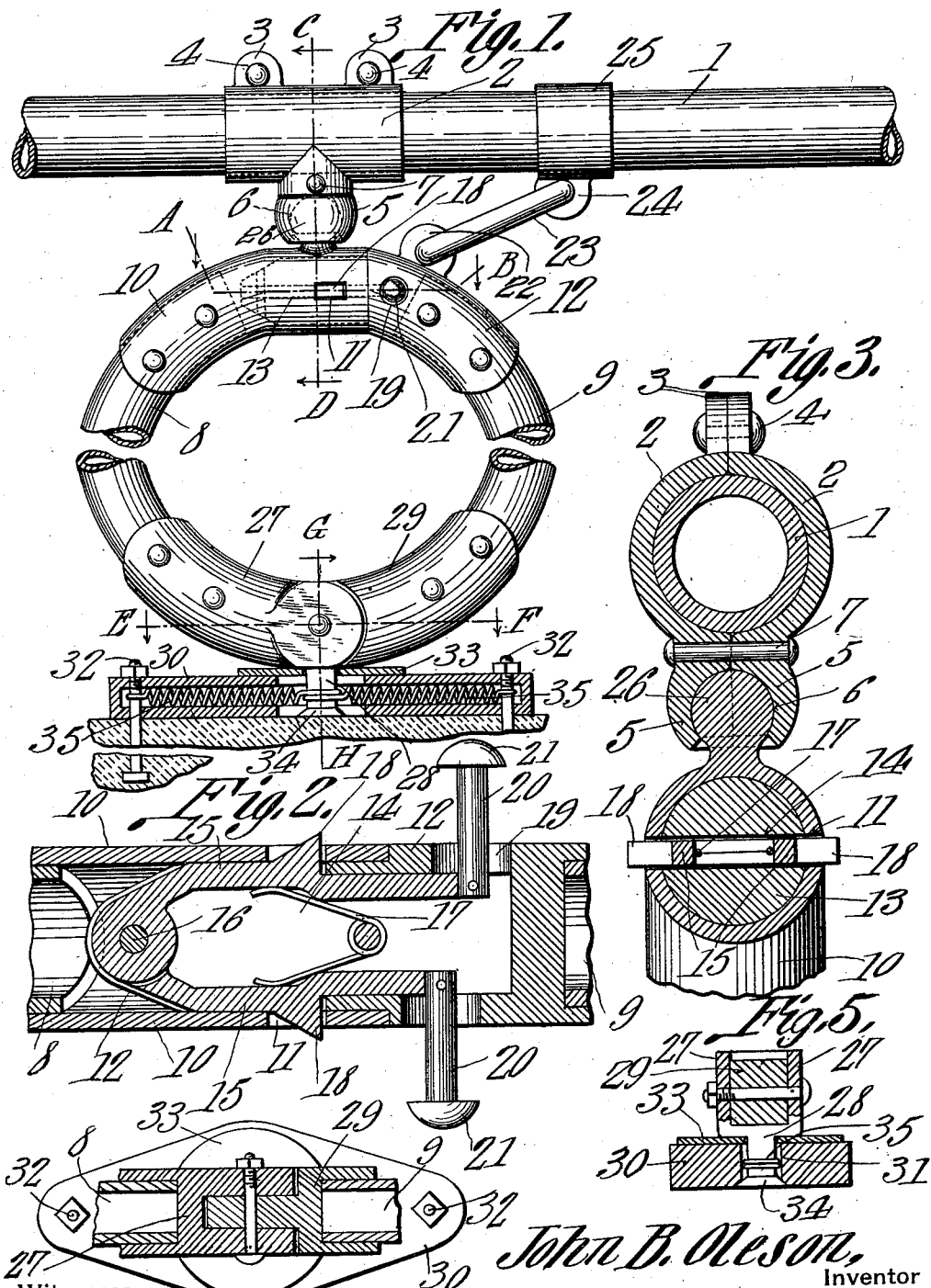
Witnesses
John B. Oleson,
Inventor
by C. A. Snow & Co.
Attorneys

UNITED STATES PATENT OFFICE.

JOHN B. OLESON, OF FORT ATKINSON, WISCONSIN.

STANCHION.

1,001,071.

Specification of Letters Patent. Patented Aug. 22, 1911.

Application filed June 11, 1910. Serial No. 566,437.

*To all whom it may concern:*

Be it known that I, JOHN B. OLESON, a citizen of the United States, residing at Fort Atkinson, in the county of Jefferson and State of Wisconsin, have invented a new and useful Stanchion, of which the following is a specification.

This invention relates to cattle stanchions and more particularly to means for detachably connecting the stanchion bars so that they cannot become unlocked through any action of the animal held thereby.

Another object is to provide improved means for connecting one of the bars to the support whereby the stanchion may be swung bodily in any direction relative to said support.

A still further object is to provide an improved connection between the detachable stanchion bar and the support, said connection permitting the detached bar to be shifted away from the other bar of the stanchion so that it will not hang where it can be broken by freed cattle passing between the stanchions.

With these and other objects in view the invention consists of certain novel details of construction and combinations of parts hereinafter more fully described and pointed out in the claims.

In the accompanying drawings the preferred form of the invention has been shown.

In said drawings:—Figure 1 is an elevation of the upper and lower portions of the stanchion bars and with the casing of the base broken away to show the connections between them and the supports and base. Fig. 2 is an enlarged section on line A—B Fig. 1. Fig. 3 is an enlarged section on line C—D Fig. 1. Fig. 4 is a section on line E—F Fig. 1. Fig. 5 is a section on line G—H Fig. 1.

Referring to the figures by characters of reference 1 designates a supporting bar which may be formed of metal tubing and arranged on this bar is a sleeve formed of two similar opposed sections 2 each of which has upstanding ears 3 adapted to receive rivets or other fastening devices such as indicated at 4. Concavo-convex extensions 5 project downwardly from the sleeve sections and are adapted to contact so as to form a socket 6 therebetween. A rivet or other fastening device such as indicated at 7, is extended through the extensions 5 and above the socket 6.

The stanchion is made up of two bars indicated by the numerals 8 and 9 respectively, each of these bars being preferably formed of a metal tube and the bar 8 being provided at its upper end with a tubular extension 10 constituting the receiving member of the lock, this extension being provided, at diametrically opposed points, with apertures 11. The other bar, 9, has a tubular extension 12 secured upon the upper end thereof and provided with a pointed nipple 13 adapted to be inserted into the tubular member or extension 10. A longitudinal slot 14 is formed within the nipple 13 and has strips 15 movably mounted therein and connected by a pivot pin 16 arranged in the free end of the nipple. A spring 17 is interposed between the strips 15 and serves to hold said strips normally pressed against opposed portions of the member 12, there being locking lugs 18 upon the outer faces of the strip 15 and projecting beyond the slot so that, when the nipple is seated within the extension 10, these lugs are free to project into the openings 11 and lock the nipple 13 within the extension 10. Openings 19 are formed in diametrically opposed portions of the extension 12 and pins 20 are movably mounted in these openings and pivotally connected to the ends of the strips 15, each of these pins carrying a button 21. An ear 22 is formed upon the extension 12 and is connected by a link 23, with an ear 24 extending from a sleeve 25. This sleeve is slidably mounted on the bar 1.

A ball extension 26 is formed on the member 10 and projects into the socket 6, the said ball and socket thus forming a universal connection between the member 10 and the sleeve 2 whereby the stanchion can be swung in any direction desired relative to the bar 1.

It will be noted that the two bars 8 and 9 can be quickly secured together by inserting the nipple 13 into the member 10 until the lugs 18 arrive between the openings 11 whereupon the spring 17 will shift the lugs outwardly into the openings and thus securely fasten the two bars in place.

Should the animal press against either of the buttons 21 it would merely result in the withdrawal of one of the lugs from engagement with the member 10 and the other lug 18 will continue to securely fasten the parts together. In order to separate the two parts it is necessary to simultaneously depress both of the buttons 21 in order to shift the lugs 18 out of the two openings 11. Obviously this could not be done by the animal held in the stanchion. When the bar 9 is unlocked from the bar 8, it will be supported from the sleeve 25 by the link 23 and said sleeve can be shifted along the bar 1 so as to support the bar 9 at any desired point. As the bar 9 is thus loosely supported, it will be obvious that should an animal move against it in passing under the bar 1, there would be no danger of the said bar 9 or its connection becoming broken.

The parts thus far described are located at the upper end of the stanchion. The lower ends of the two bars 8 and 9 are adapted to be anchored in a novel manner. Bar 8 has a tubular casting or extension 27 provided with a downwardly projecting lug 28. The lower end of the bar 9 also has an extension 29 which extends into and is hingedly connected to the extension 27. Lug 28 is slidably mounted within a slot formed within a base plate 30 which is anchored to a concrete bed or the like by means of bolts 32 or other suitable securing devices. The slot has been indicated at 31 and is constantly closed at the top by a slide 33 which is secured to and moves with the lug 28. The lower end of the lug is enlarged or upset as at 34 so as to prevent its being withdrawn through the slot. Springs 35 extend in opposite directions from the lug and are secured to the bolts 32, each spring serving to hold the lug normally centered within the slot. It will thus be observed that by mounting the lower ends of the stanchion bars in the manner described, they can be shifted laterally at their lower ends.

Various changes can be made in the construction and arrangement of the parts without departing from the spirit or sacrificing any of the advantages of the invention as defined in the appended claims.

What is claimed is:—

1. A stanchion including a base plate, a member slidably mounted therein, means for yieldingly holding said member centered within the base plate, a support, a stanchion bar connected at one end to said member and connected by a universal joint at its other end to the support, a stanchion bar hingedly connected to the slidable member, and means for detachably securing said bar to the upper end of the other bar.

2. A stanchion including movably connected bars, means for anchoring both bars at their lower ends, a supporting bar, a sleeve fixedly connected to the supporting bar, a universal connection between the sleeve and the upper end of one of the stanchion bars, a sleeve slidably mounted on the supporting bar, a link connection between the slidable sleeve and the upper end of the other stanchion bar, and coöperating means upon the upper end portions of the stanchion bars for detachably holding the bars together.

In testimony that I claim the foregoing as my own, I have hereto affixed my signature in the presence of two witnesses.

JOHN B. OLESON.

Witnesses:
 G. E. WARD,
 O. W. DONKLE.

---

Copies of this trade-mark may be obtained for five cents each, by addressing the "Commissioner of Patents. Washington, D. C."